Feb. 7, 1956 — W. G. COLTON — 2,733,926

CHUCK

Filed April 26, 1952

INVENTOR.
WILBERT G. COLTON
BY
Beau, Brooks, Buckley & Bean.
ATTORNEYS

United States Patent Office 2,733,926
Patented Feb. 7, 1956

2,733,926

CHUCK

Wilbert G. Colton, Buffalo, N. Y.

Application April 26, 1952, Serial No. 284,570

14 Claims. (Cl. 279—75)

This invention relates generally to chucks, and more particularly to chucks for holding workpieces such as dies and the like during cutting, grinding, polishing, and related operations thereon.

While not limited thereto, the chuck of the instant invention is particularly adapted for holding a workpiece such as a tungsten carbide or diamond die during resurfacing operations thereon. In such operations, much time can be consumed in placing the die in and removing the same from the chuck, resulting in inefficiency and wasted effort. In addition, it is essential that the die be properly centered in the chuck, and that dust, powder and other debris resulting from the resurfacing operations be prevented from impairing the proper operation of the chuck.

It is an object of this invention to provide a chuck of the aforesaid type incorporating means facilitating the quick removal of workpieces therefrom.

Another object of this invention is to provide a chuck having means facilitating the quick insertion of workpieces therein.

A further object of this invention is to provide a quick-acting chuck of the aforesaid type which is selectively operable to forcibly expel workpieces therefrom.

Still another object of this invention is to provide a chuck having the aforesaid features and incorporating means for removing therefrom powder and other debris resulting from the operations performed on the workpiece.

Also, an object of this invention is to provide a chuck as aforesaid having means insuring proper lubrication thereof.

In addition, it is an object of this invention to provide a quick-acting chuck having means automatically centering the workpiece therein.

Still another object of this invention is to provide a chuck having the aforesaid characteristics and which is relatively simple in construction, inexpensive to manufacture, and long lasting and completely reliable in operation.

The aforesaid and other objects will become clearly apparent upon reading the following detailed description, taken together with the accompanying drawings forming a part thereof wherein like reference numerals are used throughout the various views to identify like parts, and wherein.

Figure 1:
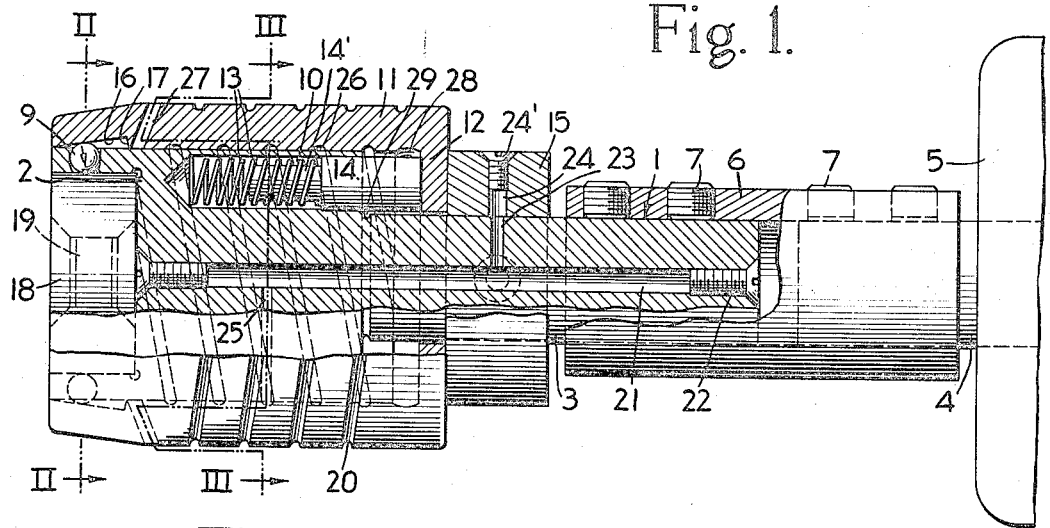
Fig. 1 is a side view, partly in section, of the quick-acting chuck of the instant invention.
Figure 2:
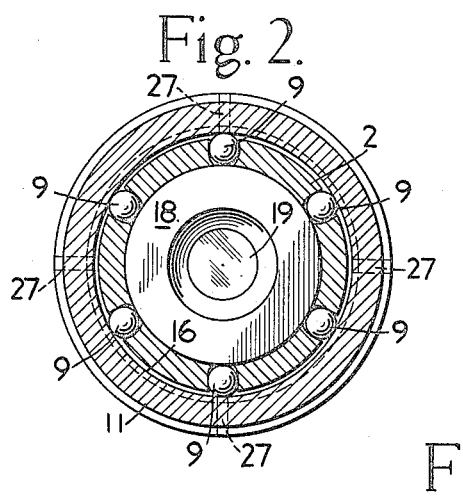
Fig. 2 is a transverse sectional view taken along line II—II of Fig. 1.
Figure 3:
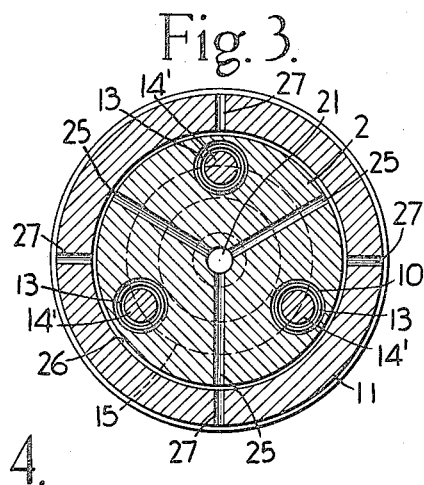
Fig. 3 is another transverse sectional view, taken along line III—III of Fig. 1.

The quick-acting chuck of the instant invention is seen to comprise a core member 1 having an enlarged head portion 2 and a relatively slender shank portion 3. Member 1 is connected to the rotary drive shaft 4 of a suitable motor 5 in driven engagement therewith by means of an adaptor 6. Adaptor 6 is seen to comprise a tubular sleeve fitting over the outer end of each of shaft 4 and shank 3 and secured thereto by means of set screws 7, whereby core piece 1 is detachably secured to shaft 4.

Head portion 2 is hollowed out at its front face to provide a cylindrical socket 8 for receiving a workpiece such as a die, and the side wall thereof provides a cage for multiple ball bearings 9, in the present instance six in number. Of course, the number of ball bearings could be increased or decreased, if desired. The rear face of head portion 2 is bored to provide multiple holes 10, in the instant application three in number, which holes retain spring biased pusher members to be described.

A sleeve member 11 of generally tubular shape provided with a rear wall portion 12 slidably fits over head portion 2, and is resiliently biased rearwardly along head portion 2 by resilient spring members 13 fitted between the inner end of each of holes 10 and fiber pusher members 14 carried within holes 10 and resiliently bearing against rear wall 12 of sleeve member 11. Springs 13 extend around guides 14' on pusher members 14, whereby said springs and pusher members remain in alinement. A stop collar 15 is mounted on shank 3 of member 1 by conventional means, as for example set screw 16', and serves to limit rearward movement of sleeve 11 under the influence of springs 13. Thus, sleeve member 11 normally is biased toward its rearward position against collar 15, but can be moved forwardly along head portion 2 by overcoming the bias of springs 13.

The forward end portion of sleeve 11 is of reduced wall thickness and tapers inwardly, and is provided with an inner wall 16 terminating at its rearward end in a shoulder portion 17. Wall 16 tapers outwardly and rearwardly while shoulder 17 is sharply tapered inwardly and rearwardly as viewed in Figs. 1 and 4. In the illustrated embodiment, shoulder 17 extends at right angles to wall 16, and the latter extends at an angle of approximately 9° to the horizontal. The importance of this inner wall and shoulder arrangement will become clearly apparent.

The operation of the chuck of the instant invention is as follows. A workpiece, such as that illustrated in broken lines at 18 in Figs. 1 and 4 and which may be a conventional tungsten carbide or diamond die having a hole 19 therein through which wire or the like is drawn, is adapted to be received and held within socket 8. Motor 5 is energized to rotate core 1 and sleeve 11 at the desired speed, and when it is desired to place the die in the chuck, sleeve 11 is manually pulled forwardly against the bias of springs 13. Upon such forward movement of sleeve 11, wall 16 recedes to permit bearings 9 to move outwardly under the influence of centrifugal force imparted by the rotation thereof through core 1, sleeve 6 and shaft 4 from motor 5. Die 18 is then manually slipped into socket 8, and at the same time sleeve 11 is released to move rearwardly under the influence of springs 13. As sleeve 11 completes its rearward movement into abutting relation with collar 15, wall 16 bears inwardly and rearwardly against bearings 9, as illustrated by the arrow in Fig. 1, and thus presses the same against die 18 to hold said die in place in socket 8. It will be noted that bearings 9 automatically center the die in the chuck.

Except when sleeve 11 is manually held against rotation, the same rotates at the same speed as core member 1 by reason of the friction engagement between wall 12 and collar 15 caused by springs 13 and pushers 14. This rotation is quickly transmitted to die 18 by bearings 9, and consequently said die virtually immediately rotates at the speed of shaft 4. The die can then be readily worked upon as by a grinding process or the like.

It will be appreciated that it is a very simple and quick matter for the operator to grasp sleeve 11 with one hand and pull it forwardly and at the same time insert die 18 into socket 8. It is necessary to insert die 18 only a portion of the distance into socket 8, whereupon with release of sleeve 11 the die is immediately drawn completely into socket 8, by reason of wall 16 bearing against ball bearings 9 with an inwardly and rearwardly directed force, and caused to rotate at the speed of shaft 4. It will be noted that bearings 9 are located adjacent the open end of socket 8, whereby they immediately bear against the die to pull the same into socket 8 and then bear against the forward side portion thereof to securely hold the die in socket 8.

Figure 4:
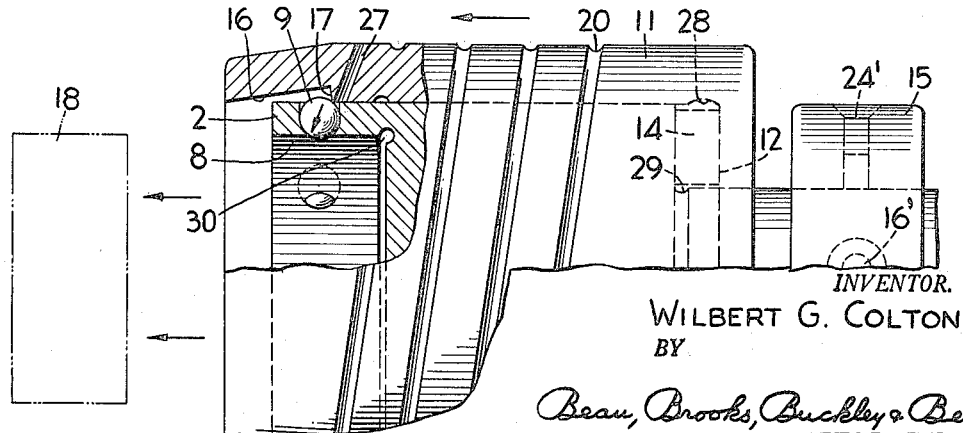
Fig. 4 is a fragmentary view of the head portion of the chuck of Fig. 1, and showing its operation in forcibly expelling a workpiece such as a die therefrom.

Once the grinding or other operation on die 18 has been completed, the chuck of the instant invention is manually actuated to forcibly expel said die in a rapid manner. To this end, it is simply necessary to grasp sleeve 11, thus stopping rotation of the same, and move the same forward to its extreme position against the bias of springs 13. Upon being moved to this extreme forward position, as illustrated in Fig. 4, shoulder 17 is caused to bear against bearings 9 and, by reason of its inclination, bears thereagainst with a forwardly and inwardly directed force. Since sleeve 11 is held against rotation, bearings 9 cause die 18 to begin rotating at twice the speed of core member 1, and this, together with the forwardly directed force component exerted on bearings 9 by the sleeve, causes die 18 to fly or shoot out of socket 8 and be thus completely expelled from the chuck.

It will be understood that upon moving sleeve 11 forwardly and thus releasing the pressure on bearings 9, there will be some tendency for die 18 to roll out of socket 8, but the instant invention, by reason of its novel arrangement including shoulder 17 bearing against ball bearings 9 with a forwardly directed force component, imparts an added kick or impetus to this rolling tendency, thereby causing the die to literally shoot out of socket 8. Thus, it will be appreciated that the operator need merely grasp sleeve 11 with one hand and move the same forwardly, preferably with a fairly rapid movement, whereupon die 18 will immediately fly outwardly. The operator can then immediately place another die in the chuck in the manner previously described. Additionally, the exterior surface of sleeve 11 may be grooved or otherwise roughened, as shown at 20, whereby to facilitate the securing of a grip on the same.

It will be appreciated therefore that the operation of this chuck is extremely rapid and that there is an absolute minimum of lost motion or time involved in placing a die in the chuck and in expelling a die therefrom. The rearwardly directed force component produced by wall 16 tends to pull the die into socket 8, and the forwardly directed force component produced by shoulder 17 forcibly ejects the die from the socket. Except for manual movement of sleeve 17, partially placing the die in socket 8, and catching the die as it is expelled from the socket, the operation of this chuck is entirely automatic, and one operator can rapidly operate this chuck using one hand to move sleeve 11 and the other hand to place dies in socket 8 and catch dies expelled therefrom. Thus, the instant invention represents a significant contribution to the art.

In addition, the quick-acting chuck of the instant invention incorporates self-cleaning and lubricating means as follows. Head portion 2 and shank 3 have an oil hole 21 extending therethrough, which hole is plugged at each end thereof as by means of set screws 22 or the like. Also, shank 3 has a second oil hole 23 extending transversely thereof to its outer surface and communicating at its inner end with hole 21. Collar 15 has an oil hole 24 extending radially thereof, and when collar 15 is assembled on shank 3, hole 24 is alined with hole 23.

Head portion 2 has three radially extending oil holes 25 extending therethrough and communicating with hole 21, and at their outer ends said holes 25 communicate with a spiral groove 26 which extends along the inner surface of sleeve 11 from wall 12 forwardly to a point adjacent shoulder 17 where it communicates with four escape holes 27 extending from the inner to the outer wall of sleeve 11 and extending slightly rearwardly. Thus, holes 24, 23, 21 and 25, groove 26, and holes 27 together form a continuous oil passage means extending through the chuck.

Oil is added to hole 21 extending through head portion 2 and shank 3 by means of holes 23 and 24, and hole 24 is then closed as by means of set screw 24'. Because of the rotation of core 1 and sleeve 11, said oil works its way forwardly and then outwardly through holes 25, along groove 26, and outwardly through openings or holes 27. This moving oil will collect any diamond dust and other debris from the resurfacing operation tending to accumulate between sleeve 11 and core 1, and will move the same outwardly along groove 26 and through holes 27, thus keeping the chuck clean of dirt accumulations which might otherwise tend to impair the operation thereof. Simultaneously, proper lubrication is applied to the chuck to facilitate proper functioning of the various parts thereof. Also, it will be noted that sleeve 11, core 1, and socket 8 are all slightly undercut at various corner portions thereof, as at 28, 29, and 30, respectively, whereby to accommodate any slight accumulations of dirt and dust which might not be removed by the oil without impairing operation of the chuck. The rearward inclination of holes 27 tends to keep oil and debris moving therethrough away from the front of the chuck.

Thus, it is seen that the instant invention fully accomplishes its aforesaid objects, and provides a quick-acting chuck having means facilitating the placing of dies and the like therein as well as forcibly expelling the same therefrom, and which is largely automatic and extremely rapid in operation. Various modifications of the embodiment herein disclosed and illustrated will occur to those skilled in the art, and it is intended that the instant invention be limited solely by the scope of the appended claims.

Having fully disclosed and completely described the instant invention in a preferred embodiment thereof, together with its mode of operation, what is claimed as new is as follows:

1. A quick-acting chuck for holding a workpiece such as a die comprising, a rotatable body member having a recess at one end thereof for receiving the workpiece, ball means carried by the side wall of said recess and arranged to bear against a workpiece therein, a sleeve member fitting around and movable on said body member, said sleeve member being spring biased for movement in one direction axially along said body member, stop means limiting the movement of said sleeve member in said one direction, and means movable with said sleeve member exerting pressure inwardly against said ball means for engaging said ball means against a workpiece in said recess in a first axial direction upon movement of said sleeve member in said one direction and inwardly against said ball means in a second axial direction for engaging said ball means against a workpiece in said recess upon movement of said sleeve member in the opposite direction.

2. A chuck for holding a workpiece such as a die comprising, a rotatable body member having a socket at one end thereof for receiving a workpiece, ball means carried by the wall of said socket for bearing against a workpiece therein, sleeve means fitting around said body member and movable therearound and therealong, stop means limiting the axial movement of said sleeve means relative to said body member in either direction, and means movable with said sleeve means and exerting pressure inwardly and rearwardly against said ball means and urging the same against a workpiece in said socket upon movement of said sleeve means in one direction axially of said body member for securing the workpiece in said socket and inwardly and forwardly against said ball means and urging the same against a workpiece in said socket upon movement of said sleeve means in the opposite direction axially of said body member to expel the workpiece from said socket.

3. A quick-acting chuck device for holding a workpiece such as a die comprising, a core member having a recess at one end thereof for receiving a workpiece, bearing means carried by said core member adjacent said recess for bearing against a workpiece therein, outer sleeve means carried by said core member and movable axially therealong, first means movable with said sleeve means and exerting pressure inwardly and rearwardly against said bearing means and urging the latter against a workpiece in said recess upon movement of said sleeve means in one direction axially of said core member for securing a workpiece in said recess, and second means movable with said sleeve means and exerting pressure inwardly and forwardly against said bearing means and urging the latter against a workpiece in said recess upon movement of said sleeve means in the opposite direction axially of said core member for releasing a workpiece from said recess.

4. A quick-acting chuck for holding a workpiece comprising, a body member having a socket at one end thereof for receiving a workpiece, bearing means carried by said body member for bearing against a workpiece in said socket, a tubular member fitting around said body member and movable axially therealong, stop means limiting axial movement of said tubular member in one direction, spring means extending between said body member and said tubular member and biasing said tubular member for axial movement in said one direction, means movable with said tubular member and exerting pressure inwardly against said bearing means with a force component directed inwardly axially of said body member and urging said bearing means against a workpiece in said socket upon movement of said tubular member in said one direction, thereby securing the workpiece in said socket, and means movable with said tubular member and exerting pressure inwardly against said bearing means with a force component directed outwardly axially of said body member and urging said bearing means against a workpiece in said socket upon movement of said tubular member in the opposite direction, thereby releasing the workpiece from said socket.

5. A chuck device for holding a workpiece such as a die comprising, a body member having means defining a workpiece-receiving socket at one end thereof, ball bearing means carried by said body member to bear against a workpiece within said socket, and sleeve means extending around said one end of said body member and movable axially thereof between two predetermined positions, said sleeve means having first wall means inclined in one direction with respect to the axis of said body member and exerting pressure inwardly through said ball bearing means against a workpiece in said socket upon movement of said sleeve means to one of said predetermined positions, and second wall means inclined in the opposite direction with respect to said first wall means and exerting pressure inwardly through said ball bearing means against a workpiece in said socket upon movement of said sleeve means to the other of said predetermined positions.

6. In a chuck for holding a generally cylindrical workpiece, a body member rotatable about an axis, means defining a workpiece-receiving recess in one end of said body member, ball means carried by said body member for bearing against a workpiece within said recess, sleeve means fitted around said body member and movable axially therealong between two predetermined positions, spring means resiliently biasing said sleeve means to one of said predetermined positions, wall means on said sleeve means inclined in one direction with respect to said axis and exerting pressure inwardly against said ball means and therethrough against a workpiece in said recess when said sleeve means is in one of said predetermined positions, and shoulder means on said sleeve means inclined in the opposite direction with respect to said axis and exerting pressure inwardly against said ball means and therethrough against a workpiece in said recess when said sleeve means is in the other of said predetermined positions.

7. A quick-acting chuck for holding a workpiece such as a die comprising, a body member adapted for rotation and having a recess at one end thereof for receiving a workpiece, ball means arranged adjacent said recess for bearing against a workpiece within said recess, sleeve means fitting around said one end of said body member and movable axially therealong in either direction, spring means resiliently biasing said sleeve means for movement in one axial direction, wall means on said sleeve means inclined with respect to the axis of rotation of said body member to bear inwardly against said ball means and therethrough against a workpiece in said recess upon movement of said sleeve means under the bias of said spring means, and shoulder means on said sleeve means extending at substantially a right angle to said wall means and bearing inwardly against said ball means and therethrough against a workpiece in said recess upon predetermined movement of said sleeve means against the bias of said spring means.

8. A quick-acting chuck for holding a workpiece such as a die comprising, a body member having a recess at one end thereof for receiving the workpiece, ball means carried by said body member adjacent the open end of said recess for bearing against a workpiece within said recess, sleeve means fitted around said one end of said body member and movable axially therealong in either direction between predetermined limiting positions, spring means biasing said sleeve means for movement in one of said directions to one of said limiting positions, first wall means movable with said sleeve means inclined rearwardly and outwardly relative to the axis of said body member and exerting pressure inwardly through said ball means against a workpiece in said recess upon movement of said sleeve means to said one of said limiting positions, and second wall means inclined forwardly and outwardly relative to the axis of said body member and exerting pressure inwardly through said ball means against a workpiece in said recess upon movement of sleeve means against the bias of said spring means to the other of said limiting positions.

9. A chuck for holding a workpiece such as a die comprising, a rotatable body member comprising a shank portion and a head portion having a recess at one end thereof for receiving the workpiece, ball means movable with said body member arranged to bear against a workpiece within said recess, sleeve means movable on said head portion axially of said body member, spring means biasing said sleeve means for movement in one direction, means movable with said sleeve means exerting pressure inwardly and rearwardly against said ball means and urging the latter against a workpiece in said recess upon movement of said sleeve means under the bias of said spring means, means movable with said sleeve means exerting pressure inwardly and forwardly against said ball means and urging the latter against a workpiece in said recess upon movement of said sleeve means in the opposite direction, and fluid passage means for a fluid such as oil extending from said shank portion through said head portion to the inner surface of said sleeve means and therealong to outlet means adjacent the forward end of said sleeve means.

10. In a chuck for holding a workpiece such as a die, a member comprising a shank portion terminating at one end in an enlarged cylindrical head portion, means defining a recess in the outer end of said head portion for receiving a workpiece, ball means arranged adjacent said recess for bearing against a workpiece therein, sleeve means fitted around said head portion for movement relative thereto, means movable with said sleeve means exerting pressure inwardly and rearwardly against said ball means and urging the latter against a workpiece in said recess upon movement of said sleeve means in one direction axially of said member, means movable with said sleeve means exerting pressure inwardly and forwardly against said ball means and urging the latter against a workpiece in said recess upon movement of said sleeve means in the opposite direction axially of said member, first fluid passage means extending spirally along the inner wall of said sleeve means from a point adjacent the inner end thereof to outlet means adjacent the forward end thereof, and second fluid passage means extending from said shank portion into said head portion and terminating in substantially radially extending passage means communicating with said first fluid passage means.

11. A chuck for holding a workpiece of cylindrical outline such as a die comprising, a rotatable body member having a workpiece-receiving socket at one end thereof, ball bearing means carried by the wall of said socket to bear against a workpiece therein, and means for selectively alternatively pressing said ball means inwardly and rearwardly and inwardly and forwardly against a workpiece in said socket.

12. In a chuck device for holding a workpiece such as a die, a rotatable body member having a workpiece-receiving recess adjacent one end thereof, ball bearing means carried by said body member adjacent said recess to bear against a workpiece therein, sleeve means carried by said body member and movable thereon, means biasing said sleeve means to a predetermined position on said body member, and means movable with said sleeve means and exerting pressure inwardly and rearwardly against said ball means and urging the same against a workpiece in said recess when said sleeve means is in said predetermined position.

13. A chuck device for holding a workpiece such as a die comprising, a generally tubular sleeve means, a core means having a workpiece-receiving socket adjacent one end thereof movable within said sleeve means, bearing means carried by said core means for bearing against a workpiece within said socket, spring means biasing said sleeve means to a predetermined position relative to said core means for securing a workpiece in said socket, and means movable with said sleeve means exerting an inwardly and forwardly directed pressure against said bearing means and urging the same against a workpiece in said socket upon movement of said sleeve means against the bias of said spring means away from said predetermined position for releasing a workpiece from said socket.

14. A quick-acting chuck for holding a workpiece such as a die comprising, a rotatable body member having a recess at one end thereof for receiving a workpiece, ball bearing means carried by said body member adjacent said recess to bear against a workpiece therein, sleeve means fitted around and movable on said body member, means movable with said sleeve means for urging said ball bearing means against a workpiece in said recess and bearing inwardly against said ball bearing means with a pressure having forwardly and rearwardly directed force components alternating with movement of said sleeve means in opposite directions, whereby said ball bearing means alternately urge a workpiece into and out of said recess and fluid passage means for a lubricating and cleaning fluid extending along and between said sleeve means and said body member.

References Cited in the file of this patent

UNITED STATES PATENTS

| | | |
|---|---|---|
| 594,330 | Cox, Jr. | Nov. 23, 1897 |
| 1,124,981 | Weaver | Jan. 12, 1915 |
| 1,636,421 | Knott | July 19, 1927 |
| 1,760,354 | Gartin | May 27, 1930 |
| 1,825,219 | Weber | Sept. 29, 1931 |
| 2,502,981 | Mould | Apr. 4, 1950 |
| 2,569,616 | Mann | Oct. 2, 1951 |